(12) United States Patent
Kang

(10) Patent No.: US 7,004,147 B2
(45) Date of Patent: Feb. 28, 2006

(54) FUEL INJECTION CONTROL METHOD FOR LIQUEFIED PETROLEUM GAS INJECTION ENGINE AND APPARATUS THEREOF

(75) Inventor: Dae-Jin Kang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/968,222

(22) Filed: Oct. 18, 2004

(65) Prior Publication Data

US 2005/0087177 A1    Apr. 28, 2005

(30) Foreign Application Priority Data

Oct. 27, 2003   (KR) ...................... 10-2003-0075058

(51) Int. Cl.
*F02M 51/00*   (2006.01)
*F02B 43/00*   (2006.01)

(52) U.S. Cl. ................ 123/479; 123/491; 123/527
(58) Field of Classification Search ................ 123/1 A, 123/479, 491, 525–527, 575, 576, 578; 701/103–105, 701/113
See application file for complete search history.

(56) References Cited

U.S. PATENT DOCUMENTS

| | | | | |
|---|---|---|---|---|
| 5,423,303 A | * | 6/1995 | Bennett | 123/527 |
| 5,803,057 A | * | 9/1998 | Van de Brink | 123/527 |
| 6,073,619 A | * | 6/2000 | Baranowski | 123/681 |
| 6,668,804 B1 | * | 12/2003 | Dobryden et al. | 123/480 |
| 6,766,269 B1 | * | 7/2004 | Lee | 702/136 |
| 6,932,060 B1 | * | 8/2005 | Lee | 123/491 |
| 2004/0025831 A1 | * | 2/2004 | Landi et al. | 123/304 |
| 2004/0099249 A1 | * | 5/2004 | Lee | 123/464 |
| 2004/0244778 A1 | * | 12/2004 | Tanaka et al. | 123/479 |
| 2004/0245034 A1 | * | 12/2004 | Miyamoto et al. | 180/170 |
| 2005/0087176 A1 | * | 4/2005 | Lee | 123/491 |

FOREIGN PATENT DOCUMENTS

| | | | |
|---|---|---|---|
| KR | 2002031639 | * | 5/2002 |
| KR | 2003081676 | * | 10/2003 |
| KR | 2003081711 | * | 10/2003 |
| KR | 2004061191 | * | 7/2004 |
| KR | 2004094920 | * | 11/2004 |

OTHER PUBLICATIONS

Patent Abstracts of Japan, Publication No. 2002-317665, Published Oct. 31, 2002, Aisan Ind. Co., Ltd. et al.

* cited by examiner

*Primary Examiner*—Hai Huynh
(74) *Attorney, Agent, or Firm*—Edwards Angell Palmer & Dodge LLP; Peter F. Corless

(57) ABSTRACT

Fuel injection control methods and systems and related apparatus for Liquefied Petroleum gas Injection (LPI) engine are provided. Preferred methods and systems determine the increased amount of engine revolution per unit time and fuel temperature during an initial engine start period; determine fuel pressure on the basis of such values; determines propane content of the engine fuel by consideration of the fuel pressure and fuel temperature of the P-T diagram of the fuel; and controls the fuel injection time and injection period by using a map prepared according to propane content. Preferred systems and methods of the invention need not include use of fuel pressure and temperature sensors that provide injection control conditions to an Engine Control Unit, thereby providing a simplified and more efficient apparatus.

10 Claims, 5 Drawing Sheets

FUEL INJECTION CONTROL METHOD FOR LIQUEFIED PETROLEUM GAS INJECTION ENGINE AND APPARATUS THEREOF

CROSS-REFERENCE TO RELATED APPLICATIONS

The present application is based on, and claims priority from, Korean Application Serial Number 10-2003-0075058, filed on Oct. 27, 2003, the disclosure of which is hereby incorporated by reference herein in its entirety.

FIELD OF THE INVENTION

The present invention relates to fuel injection control methods and systems for a Liquefied Petroleum Gas Injection (LPI) engine. More particularly, in a preferred aspect, the present invention is adapted to compute propane content contained in Liquefied Petroleum Gas (LPG) when a vehicle is initially started and to control fuel injection according to the computed value.

BACKGROUND OF THE INVENTION

In general, LPG fuel stored in a vehicle engine LPG tank (which is also called a bombe) is vaporized in the vaporizer and then blended with exterior air in the mixer for supply into the engine cylinder. However, in the case of an LPI engine using LPG as fuel, the fuel is directly injected into the cylinder via an injector for combustion. LPI engines have gradually increased in usage due to the potential for more accurate fuel injection control.

Propane and butane are employed as main ingredients of LPG. A typical LPG fuel contains 10–30% of propane in consideration of the harsh seasonal conditions. The fuel injection control is performed by a fuel injection control map rendered on the basis of typical LPG fuel.

The Engine Control Unit (ECU) pre-saved with such a fuel injection control map receives fuel injection control conditions, e.g., fuel pressure and fuel temperature, via a separate fuel pressure sensor and fuel temperature sensor.

However, conventional LPI engines can exhibit notable drawbacks, specifically improper performance of the fuel injection control when LPG with differing contents of propane is employed, causing a deterioration of the vehicle start, increase in fuel consumption, reduction in engine output, increase in toxic exhaust gas, and the like.

Another drawback that conventional LPI engines can exhibit is that separate sensors for measuring fuel pressure and fuel temperature can be required to control the fuel injection via the ECU.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

According to a preferred embodiment of the present invention, methods and systems are provided that comprise determining or enumerating propane content of liquefied petroleum gas (LPG) when a vehicle is initially started and controlling the fuel injection in view of the determined LPG property. Such methods and systems can improve the vehicle start, engine output, and/or fuel consumption as well as minimize toxic exhaust gas.

In another embodiment, a fuel injection control apparatus for an LPI engine is provided that can perform a fuel injection control without recourse to a fuel pressure sensor and/or fuel temperature sensor providing injection control conditions to the Engine Control Unit (ECU).

In further aspects, fuel injection control methods for a Liquefied Petroleum Gas Injection (LPI) engine are provided and may comprise steps of: detecting whether an engine has started; determining (enumerating) the increased amount of the engine revolution per unit time (such as revolution per minute (rpm)) and fuel temperature if the engine has started; determining (enumerating) the fuel pressure such on the basis of the determined increased amount of the engine revolution per unit time and fuel temperature; determining (enumerating) the propane content of the Liquefied Petroleum Gas (LPG) fuel such as in view of the determined fuel temperature and fuel pressure; and controlling the fuel injection time and injection period by a map prepared according to propane content.

A fuel injection control apparatus for a Liquefied Petroleum gas Injection (LPI) engine is also provided and may comprise one or more of a crank rpm sensor or a cam rpm sensor, water coolant temperature sensor, air temperature sensor and air amount sensor. An Engine Control Unit (ECU) also is employed and determines the fuel propane content by determining (enumerating) the increased amount of engine rpm, temperature and pressure of the fuel on the basis of measured values from the sensors and pre-inputted diverse data. The ECU can control the driving circuit of the injector by a map prepared according to propane content. An injector can inject fuel by adjusting the opening and closing time and period of a nozzle or other delivery apparatus such as by a driving circuit of the injector.

It is understood that the term "vehicle" or other similar term as used herein is inclusive of motor vehicles in general such as passenger automobiles, buses, trucks, various commercial vehicles, watercraft, aircraft, and the like.

Other aspects of the invention are discussed below.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

As discussed, the invention provides methods and systems for fuel injection control and effective use of a Liquefied Petroleum gas Injection (LPI) engine. Preferred methods and systems may suitably comprise determining engine revolution per unit time (such as revolution per minute (rpm)) and fuel temperature after the start of an engine; determining fuel pressure by consideration of the determined amount of the engine revolution per revolution per unit time and fuel temperature; determining the propane content of liquefied petroleum gas of the engine by consideration of the fuel temperature and fuel pressure; and controlling one or more fuel injection properties by using a map prepared with consideration of the fuel propane content. Fuel injection properties that are controlled may suitably include fuel injection time and/or fuel injection period. Preferred methods and systems may further comprise detecting if the engine has been started, and after detecting an engine start, determining the engine revolution per unit time.

One or more preferred embodiments of the present invention will now be described in detail with reference to the attached drawings.

Figure 1:
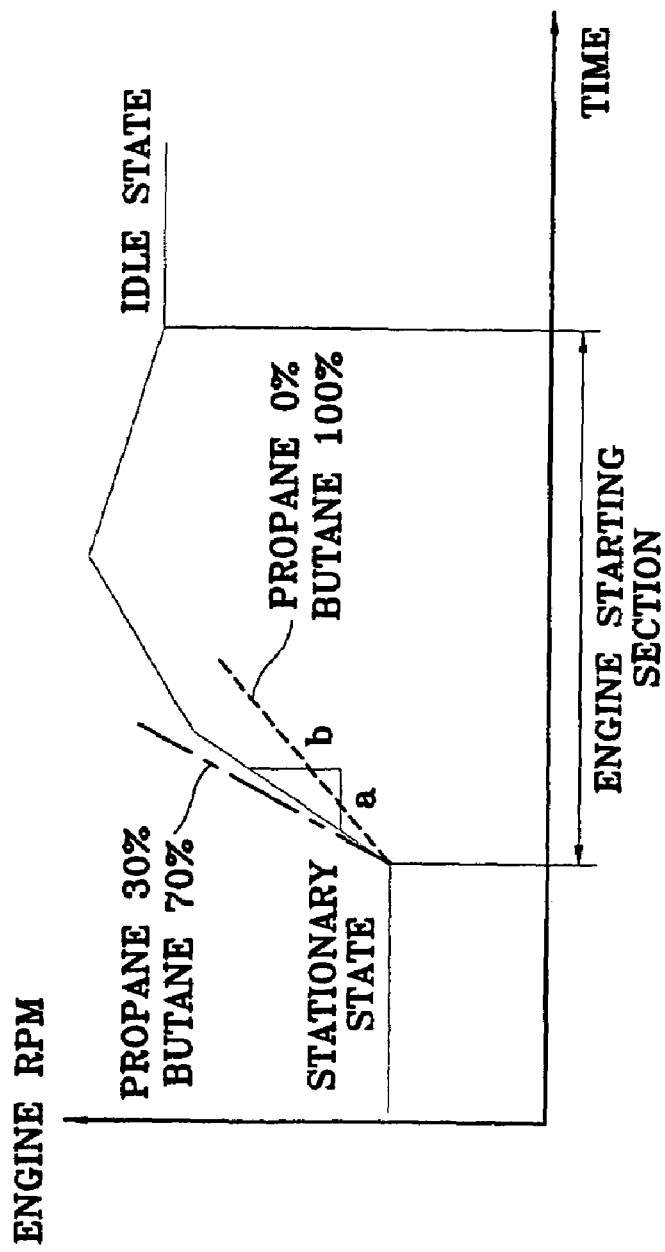
FIG. 1 is a graph of the engine revolution per minute (rpm) and time for representing the change of the engine rpm during the initial engine start.

Referring to FIG. 1, when a vehicle engine is initially started, the revolution per minute (rpm) promptly increases from a stationary state. Then the rpm of the engine continuously increases but at a less rapid degree and may gradually decrease to maintain a stable idle state. Unless indicated otherwise, references herein to revolution per minute are inclusive of the more general revolution per unit time.

Such a varying pattern of engine rpm rate during the initial engine start is typical. Additionally, the amount of the increased engine rpm during the initial engine start correlates with fuel properties.

The increased amount of engine rpm in the event of the initial engine start is represented by a slope (increased amount of the engine rpm (b)/unit time (a)) in FIG. 1. That is, if the slope is indicated by short dashed lines, the LPG fuel is entirely composed of butane 100% (propane 0%). If the slope is indicated by alternating long and short dashed lines, the LPG fuel is composed of butane 70% and propane 30%. Thus, the increased amount of the engine rpm during an initial engine start is proportional to the content of propane of the LPG fuel. It is understand that such propane and butane percentages are volume percentages based on total volume of a particular fuel sample.

In the methods and systems of the invention, an increased amount of the engine rpm can be employed as one factor to determine propane content of LPG fuel that is employed.

To further assess the propane content of the employed LPG fuel, the temperature and pressure of the LPG fuel is suitably determined.

Figure 2:
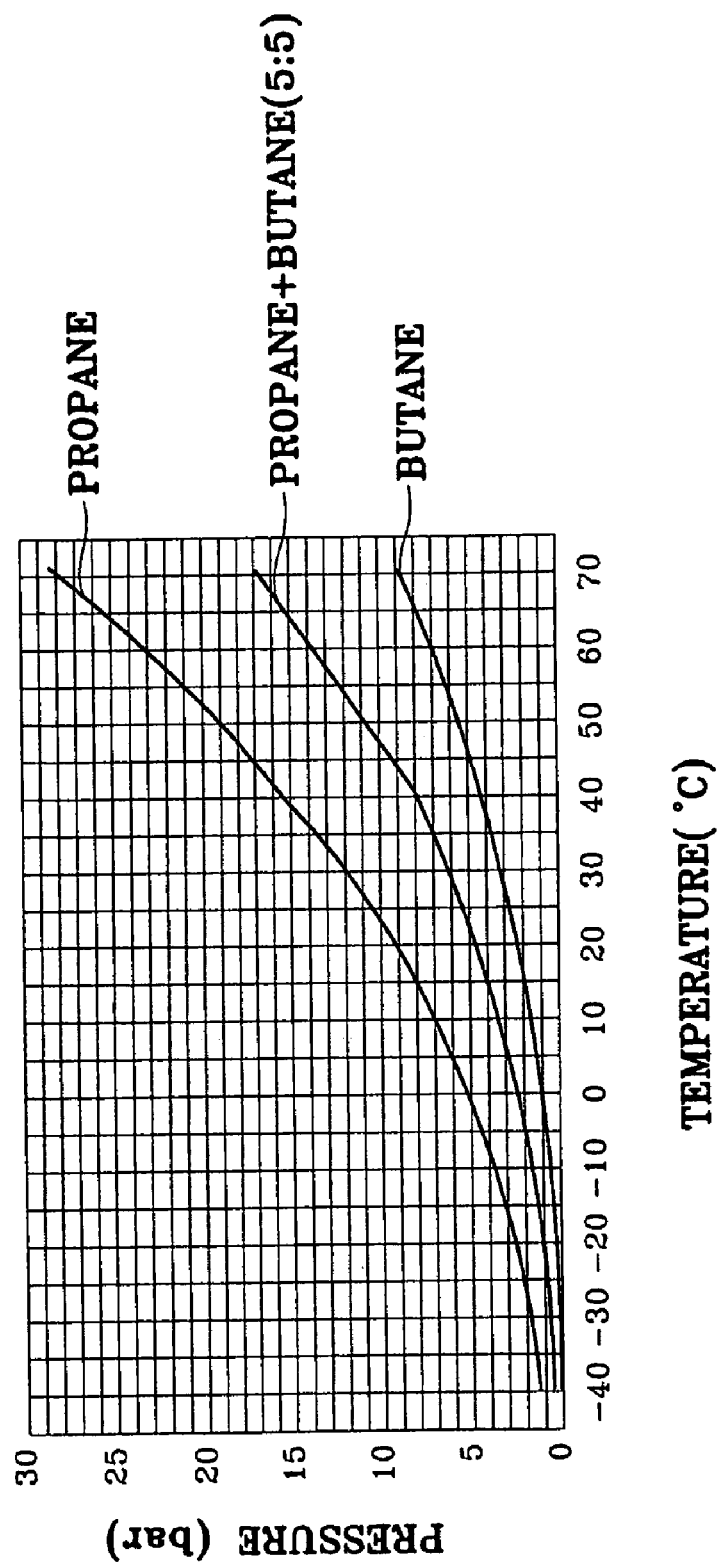
FIG. 2 is a diagram representing the Pressure (P) and Temperature (T) of the LPG fuel.

By determining the temperature and pressure of the PG fuel that is employed, the composition ratio of butane and propane of the LPG fuel can be determined on the basis of the Pressure (P)-Temperature (T) diagram of LPG of FIG. 2. In particular, this analysis enables determination of the propane content of the fuel.

The P-T diagram of the LPG fuel is saved in the ECU in a data form.

After determining the propane content of the fuel through data of the P-T diagram of the LPG fuel, fuel injection control can be carried out such as by using a map containing data prepared according to varying levels of propane content.

The ECU is pre-saved with such a data map in which the map is preset with proper amounts of correction (correcting factor) for propane content at a base injection time. The amount of correction is obtained by repeating tests according to varying fuel propane content. In certain systems, the ECU is inputted only with the injection control map in relation to the LPG fuel containing 10–30% of propane. However, in particularly preferred systems of the invention, a map covering wider ranges of propane content is employed, such as a map (data collection) that covers propane content at less than 10% and/or greater than 30% of the fuel, including maps that will cover propane contents of from 0–100% of the fuel. As discussed above, it is understand that such propane and butane percentages are volume percentages based on total volume of a particular fuel sample.

Figure 3:
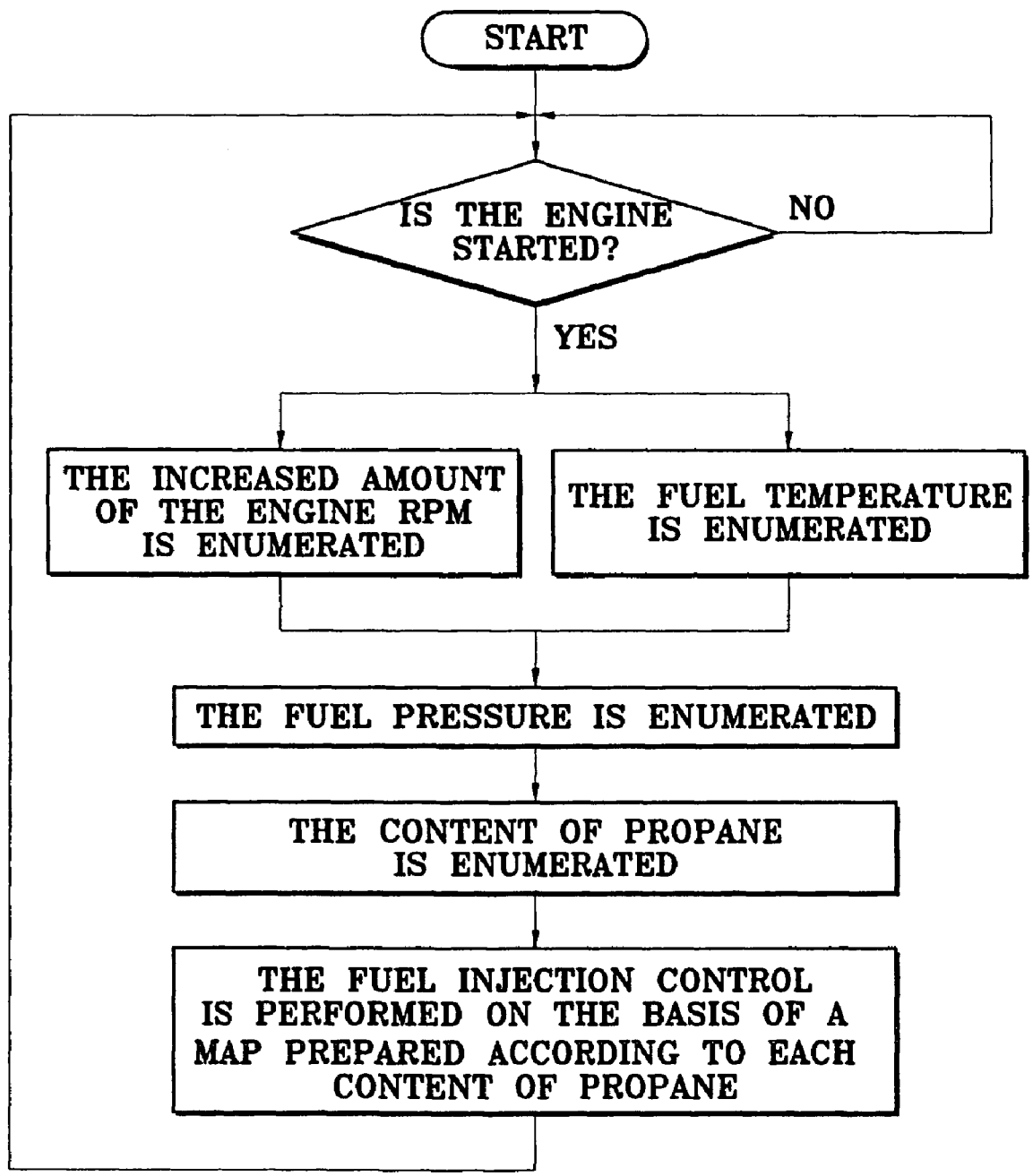
FIG. 3 is a control flowchart of a fuel injection control method of an LPI engine according to an embodiment of the present invention.

With reference to FIG. 3, various steps of particularly preferred fuel injection control methods for the LPI engine according to an embodiment of the present invention are described.

The ECU may suitably detect whether the engine has started such as via a signal of an ignition switch or the like.

If the engine is started, the ECU may suitably determine the increased amount of engine rpm and preferably the temperature of the fuel during at least during an initial start of the vehicle, e.g. during 10, 20, 30, 40, 50, 60, 90, 120, 180, 240 or 300 seconds after an engine has been detected to have started such as an ignition switch signal.

In preferred systems, the increased amount of the engine rpm when the engine is initially turned on may be suitably computed via a timer installed in the ECU by receiving the value of engine rpm per unit time (e.g. 1 second), wherein the value of the engine rpm may be provided from the crank rpm sensor.

The crank rpm sensor may be suitably substituted by a cam rpm sensor as the cam rpm detects the revolution of the camshaft, which rotates at a constant ratio in relation to the crankshaft.

The ECU suitably can determine fuel temperature by receiving conditions relevant to the fuel temperature such as one or more values from one or more of the water coolant temperature sensor, air temperature sensor, and/or air amount sensor and the like.

That is, the ECU suitably may be inputted with data pertaining to one or more fuel temperature values according to e.g. the water coolant temperature, air temperature, and/or air amount and the like. The values are pre-obtained and are inputted into the ECU in data form by repeating tests.

Accordingly, in preferred methods and systems of the invention, a separate fuel temperature sensor for measuring the fuel temperature is not required.

After determining the increased amount of the engine rpm and fuel temperature during the initial engine start, the fuel pressure is suitably computed. The pressure of the provided fuel is a function of the increased amount of the engine rpm and fuel temperature. The value of fuel pressure according to the variation of each increased amount of the engine rpm and fuel temperature is suitably inputted into the ECU in data form.

Thus, in preferred methods and systems of the invention, a separate fuel pressure sensor for measuring the fuel pressure is also not required.

When the fuel pressure is computed as thus described, the fuel propane content is determined (enumerated). Provided that the fuel temperature and pressure are determined, the composition ratio of propane and butane can be determined on the basis of the data of the LPG fuel P-T diagram such as by determining the fuel propane content.

After determining the propane content, a fuel injection control can be performed by a map prepared according to various propane amounts. As discussed above, injection time and injection period are factors of fuel injection control. Each map prepared according to the content of propane is suitably inputted with data of optimal injection time and optimal injection period. The optimal injection time and period are preferably inputted to generate maximum engine output, improve fuel consumption and/or reduce toxic components from the exhaust gas with respect to the propane content. In particular, the correcting factor can be set as a constant, wherein the factor is multiplied by the base injection time.

Once the injection time and injection period are determined according to the relevant map, the ECU can control the driving current of the injector for adjusting the opening and closing time and period of the nozzle of the injector and for performing the optimal injection control.

Accordingly, an optimized combustion according to a particular propane content level can be performed, which can result in an improvement of the engine output, increase in fuel economy, and/or decrease in toxic exhaust gas.

Figure 4:
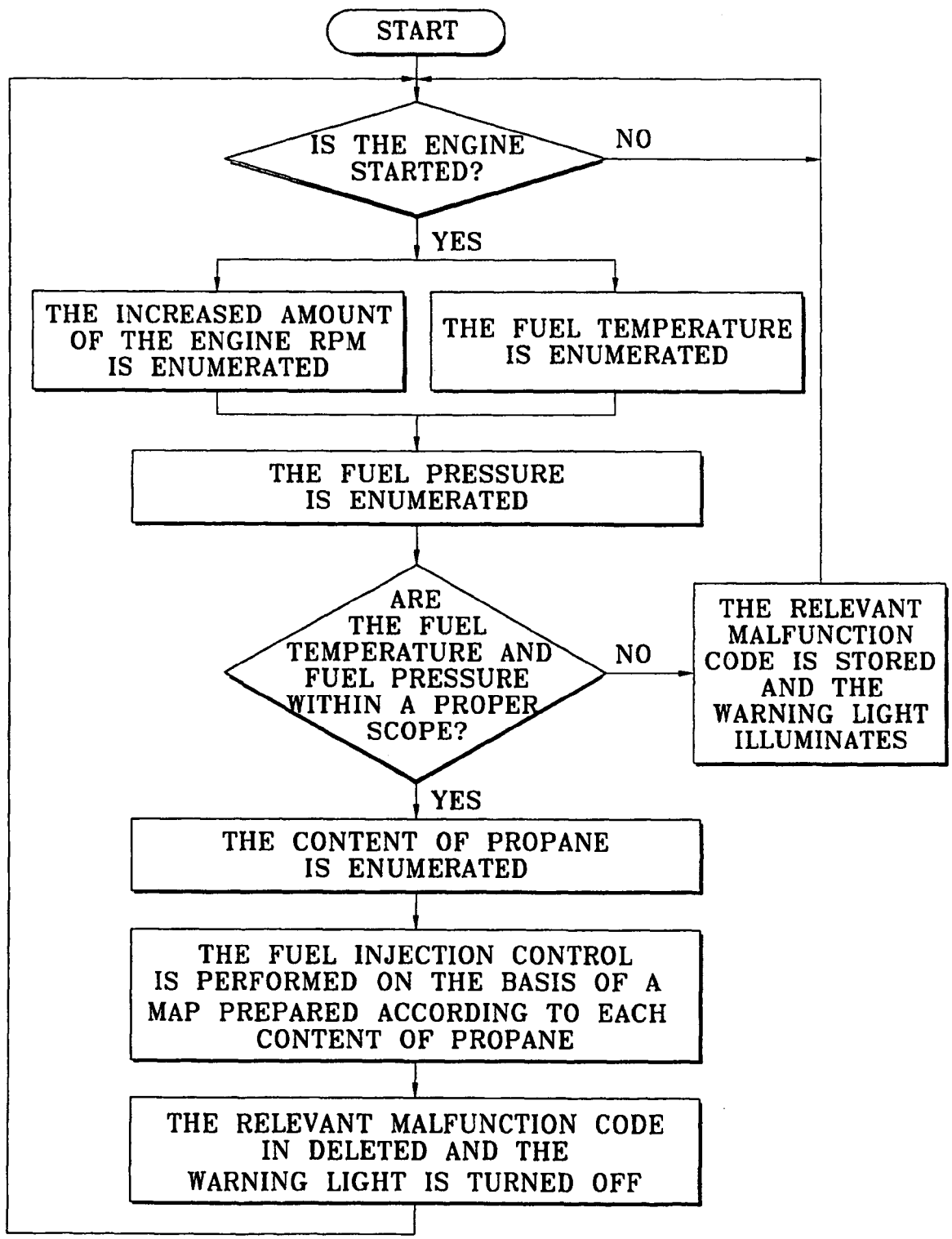
FIG. 4 is a control flowchart of a fuel injection control method including an additional step of storing a malfunction code and illuminating a warning light.

As illustrated in FIG. 4, after determining fuel pressure, if the temperature and pressure of fuel, which are previously computed, are not in a proper range, then a relevant malfunction code is stored in the ECU and a warning light installed in the passenger compartment illuminates to notify e.g. the driver or a service attendant of an abnormal state of the vehicle.

The proper range is determined in the ECU by pre-establishing maximum and minimum values of the temperature and pressure of fuel under a certain level and by comparing the values of temperature and pressure of fuel determined through the above discussed steps with the pre-established values.

If the fuel temperature and pressure are within a proper or acceptable range, the relevant malfunction code is deleted and the warning light is turned off to avoid storage of the malfunction code and thus illumination of the warning light when the vehicle is initially started.

Figure 5:
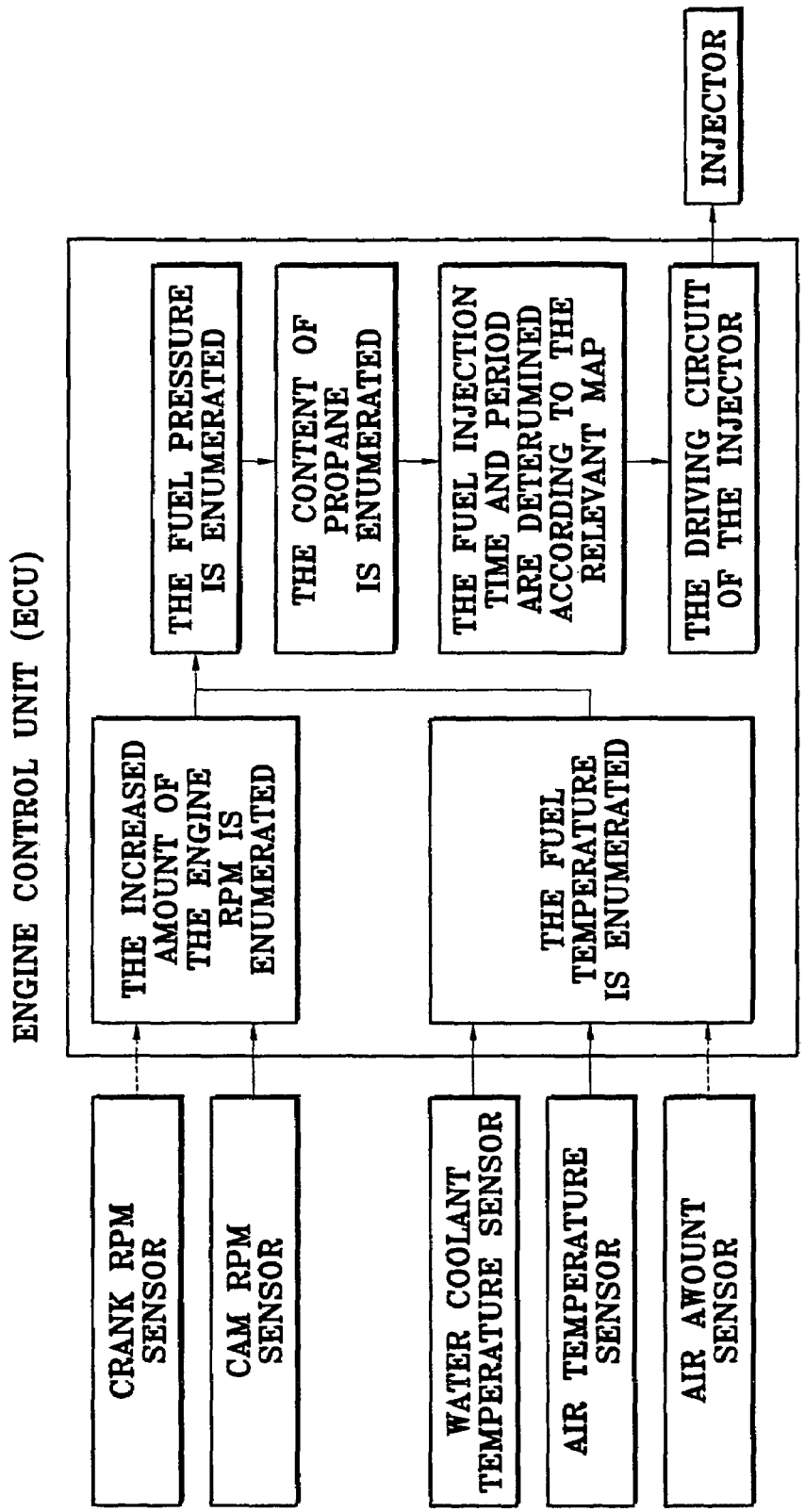
FIG. 5 is a schematic block diagram of a fuel injection control apparatus of an LPI engine according to an embodiment of the present invention.

With reference to FIG. 5, the constitution of preferred apparatus or systems of the invention are described.

A crank rpm sensor 1 or cam rpm sensor 2 is equipped to measure the engine rpm. A water coolant temperature sensor 3, air temperature sensor 4, and air amount sensor 5 are mounted to measure the water coolant temperature, air temperature, and amount of air, respectively. An ECU 10 determined the increased amount of the engine rpm per unit time of the initial vehicle start by a timer installed in the ECU and by the values of the engine rpm obtained from the crank rpm sensor 1 or cam rpm sensor 2. The ECU 10 is inputted with data containing fuel temperature values according to each water coolant temperature, air temperature, air amount and the like. The data is pre-obtained and inputted in the ECU by repeating tests to enumerate the temperature of the provided LPG fuel from the values of one or more of the water coolant temperature, air temperature and air amount applied from the water coolant temperature sensor 3, air temperature sensor 4, and air amount sensor 5. The ECU 10 is suitably inputted with data containing fuel pressure values according to the variation of the increased engine rpm and fuel temperature for enumerating the fuel pressure of LPG fuel based on the amount of the increased engine rpm and the fuel temperature. The ECU 10 is inputted with data from the P-T diagram of the LPG fuel for determining the propane content through fuel pressure and fuel temperature. The ECU 10 is further inputted with a map containing determined fuel injection time and fuel injection period according to various propane content levels. The ECU 10 suitably includes a driving circuit of the injector controlled according to the fuel injection time and fuel injection period that are determined in the map. An injector 20 injects fuel by adjusting the opening and closing time and period of a nozzle or other delivery apparatus according to the operation of the driving circuit of the injector controlled by the ECU 10.

Accordingly, an optimized injection control with consideration of fuel propane content can be carried out by driving the injector.

As indicated by the foregoing, methods and systems of the invention can provide fuel injection control with consideration of the propane content of the employed LPG, which can improve the vehicle start by the developed combustion function, increase engine output and fuel consumption, and decrease toxic exhaust gas.

Methods and systems of the invention offer the potential of the additional advantages that a fuel pressure sensor and fuel temperature sensor providing the injection control conditions to the ECU are not required in the fuel injection control apparatus, which can simplify the construction of an apparatus and minimize construction cost.

While the invention has been described with reference to specific embodiments, modifications and variations of the invention may be constructed without departing from the scope of the invention, which is defined in the following claims.

What is claimed is:

1. A fuel injection control method for a Liquefied Petroleum gas Injection (LPI) engine, comprising:
   detecting whether the engine has started;
   determining amount of the engine revolution per unit time and fuel temperature if the engine has started;
   determining fuel pressure on the basis of the determined amount of the engine revolution per unit time and fuel temperature;
   determining the content of propane of Liquefied Petroleum Gas (LPG) fuel of the engine on the basis of the fuel temperature and fuel pressure; and
   controlling the fuel injection time or injection period by using a map prepared according to fuel propane content.

2. The method as defined in claim 1, wherein the increased amount of the engine revolution per unit time is determined by consideration of the increased amount per unit time of a crank rpm or cam rpm.

3. The method as defined in claim 1, wherein the fuel temperature is determined by consideration of data containing one or more values of one or more of water coolant temperature, air temperature and air amount in relation to the fuel temperature.

4. The method as defined in claim 1, wherein the content of propane of said LPG fuel is determined by consideration of a Pressure (P)-Temperature (T) diagram of LPG fuel inputted in data form.

5. The method as defined in claim 1, wherein the method further comprises:
   storing a relevant malfunction code and activating a warning signal if the enumerated fuel temperature and fuel pressure are not within a predetermined minimum value and maximum value; and deleting the malfunction code and deactivating the warning signal if said fuel temperature and fuel pressure are within the predetermined range.

6. A fuel injection control method for a Liquefied Petroleum gas Injection (LPI) engine, comprising:

after the start of an LPI engine, determining the amount of engine revolution per unit time and fuel temperature of the engine;

determining fuel pressure by consideration of the determined amount of the engine revolution per unit time and fuel temperature;

determining the propane content of liquefied petroleum gas of the engine by consideration of the fuel temperature and fuel pressure; and controlling one or more fuel injection properties of the engine by using a map prepared with consideration of fuel propane content.

7. The method of claim 6 further comprising detecting if the engine has been started, and after detecting an engine start, determining the engine revolution per unit time.

8. The method of claim 6 wherein determination of engine revolution per unit time and fuel temperature are commenced within about 300 seconds after the engine start.

9. A fuel injection control apparatus for a Liquefied Petroleum gas Injection (LPI) engine, the apparatus comprising:

a crank rpm sensor or a cam rpm sensor;
a water coolant temperature sensor;
an air temperature sensor;
an air amount sensor;
an Engine Control Unit; and
an injector for injecting fuel by adjusting the opening and closing time and period of nozzle according to the operation of the driving circuit of said injector, wherein the Engine Control unit determines the content of propane contained in the fuel by consideration of the increased amount of engine revolution per unit time, temperature and pressure of the fuel by consideration of measured values from sensors and pre-inputted data, and the Engine Control Unit controls a driving circuit of an injector by a map prepared in consideration of propane content.

10. The apparatus as defined in claim 9, wherein the Engine Control Unit:

determines the increased amount of the engine revolution per minute per unit time of the initial vehicle start by consideration of values of the engine revolution per unit time obtained from the crank rpm sensor or cam rpm sensor;

determines the temperature of the provided liquefied petroleum gas fuel from one or more values of one or more of water coolant temperature, air temperature, air amount measured with data containing fuel temperature values according to one or more of water coolant temperature, air temperature and air amount;

determines the fuel pressure of the liquefied petroleum gas fuel from the increased amount of the engine revolution per unit time and fuel temperature with data containing fuel pressure values according to the variation of the determined increased engine revolution per unit time and fuel temperature;

determines the content of propane by consideration of the determined fuel pressure and fuel temperature with data from the P-T diagram of the liquefied petroleum gas fuel is inputted with a map containing determined fuel injection time and fuel injection period based on propane content; and controls the driving circuit of the injector by consideration of the fuel injection time and fuel injection period determined by the map.

* * * * *